(12) United States Patent  
Seguchi

(10) Patent No.: US 6,748,552 B2
(45) Date of Patent: Jun. 8, 2004

(54) STORED PROGRAM CONTROLLED SWITCHING SYSTEM

(75) Inventor: Nobuyuki Seguchi, Tokyo (JP)

(73) Assignee: NEC Corporation, Tokyo (JP)

(*) Notice: Subject to any disclaimer, the term of this patent is extended or adjusted under 35 U.S.C. 154(b) by 547 days.

(21) Appl. No.: 09/774,712

(22) Filed: Feb. 1, 2001

(65) Prior Publication Data

US 2001/0007123 A1 Jul. 5, 2001

(30) Foreign Application Priority Data

Jan. 2, 2000 (JP) .................................. 2000-024016

(51) Int. Cl.7 ................................................ G06F 11/00
(52) U.S. Cl. ........................................................ 714/6
(58) Field of Search ...................... 714/5, 6, 7

(56) References Cited

U.S. PATENT DOCUMENTS

| | | | | |
|---|---|---|---|---|
| 5,987,566 A | * | 11/1999 | Vishlitzky et al. | 711/114 |
| 6,304,980 B1 | * | 10/2001 | Beardsley et al. | 714/6 |
| 6,330,687 B1 | * | 12/2001 | Griffith | 714/6 |
| 6,484,271 B1 | * | 11/2002 | Gray | 714/6 |
| 6,539,463 B1 | * | 3/2003 | Kuwata | 711/162 |
| 2001/0039603 A1 | * | 11/2001 | Manowitz | 711/115 |

FOREIGN PATENT DOCUMENTS

| | | |
|---|---|---|
| JP | 1-309493 | 12/1989 |
| JP | 2630263 | 4/1997 |
| JP | 9-135465 | 5/1997 |
| JP | 11-85529 | 3/1999 |

* cited by examiner

Primary Examiner—Scott Baderman
Assistant Examiner—Joshua A Lohn
(74) Attorney, Agent, or Firm—Young & Thompson

(57) ABSTRACT

A stored program controlled switching system is comprised of a first set of detachably mounted nonvolatile semiconductor memory devices such as memory cards for respectively storing data of different types including a control program, a second set of detachably mounted nonvolatile semiconductor memory devices for respectively storing the data of different types. A first controller is provided for operating the first set of memory devices in a working mode and the second set of memory devices in a standby mode, copying data from the memory devices of the working mode into a main memory and further into the memory devices of the standby mode, and performing a switchover between the operating modes when trouble occurs in the first set of memory devices. A second controller operates the switching system according to the data stored in the main memory.

16 Claims, 6 Drawing Sheets

STORED PROGRAM CONTROLLED SWITCHING SYSTEM

BACKGROUND OF THE INVENTION

1. Field of the Invention

The present invention relates to a stored program controlled switching system.

2. Description of the Related Art

Current stored program controlled switching systems employ a hard disk system as a huge memory device for storing a vast amount of data such as control program, subscriber information, tariff information and information concerning maintenance, operations and administration. In order to meet new services and features and cope with software imperfections, system file data are updated by downloading data from a storage device such as digital recording tape and magnetic optical disks. For maintenance purposes, the data stored in the hard disk system are routinely duplicated onto a backup system including digital recording tape and magnetic optical disks. Because of the enormous volume of data and the speed limitations imposed on the hard disk system, it takes a long time, typically several tens of minutes, to complete an updating or a duplicating routine. Much longer time (typically several hours) is necessary to duplicate data onto a newly installed standby storage system.

In order to minimize the routine work time, Japanese Patent Publication No. 9-135465 discloses a system in which an extra memory system is provided for exclusively storing updating information, which is compared with working data. If a mismatch is detected, the corresponding portion of the working data is replaced with the updating data. Another technique disclosed in Japanese Patent Publication No. 1-309493 also relates to a stored program controlled switching system in which a card reader is provided and memory cards are used as an external storage means to store program and system data. Data stored in each memory card is read by the card reader and downloaded onto the random access memory of the switching system. A further technique is disclosed in Japanese Patent No. 2630263 in which all system are duplicated by a pair of identical subsystems including the switching network, the central processor and the hard disk system. In the duplicated hard disk systems, identical data are stored and constantly checked against each other and one of the systems is used as a working system and the other is in a standby mode. If the working system fails, a mismatch will be detected and a flag is set up, and the system is switched over from the working to the standby hard disk system. When the failed system is restored and duplicated with the current working system, the mismatched portion of data is copied from the current working hard disk system into the restored hard disk system so that same data are stored in both hard disk systems.

However, the prior art techniques still require the use of digital recording tape or magnetic optical disks as an external storage system, which contributes to the system size. Additionally, since a number of different types of data are stored, it takes time during a fault finding and recovery process to identify such data types and locate the troubled portion. Furthermore, it is often necessary to replace a failed hard disk drive. In such instances, a new hard disk drive may be shipped over long distances. During shipment, the hard disks are subjected to unfavorable transport conditions which may cause damages.

SUMMARY OF THE INVENTION

It is therefore an object of the present invention to provide a stored program controlled switching system that allows efficient trouble shooting and efficient maintenance routine.

Another object of the present invention is to provide a stored program controlled switching system that reduces the system size by eliminating the need to provide bulky recording systems.

Still another object of the present invention is to provide a stored program controlled switching system that reduces shipment cost at low probability of damage which would otherwise occur during shipment of memory devices.

According to the present invention, there is provided a stored program controlled switching system comprising a first set of detachably mounted nonvolatile semiconductor memory devices for respectively storing data of different types including a control program, a second set of detachably mounted nonvolatile semiconductor memory devices for respectively storing the data of different types, and a main memory. A first controller is provided for operating the first set of memory devices in a working mode and operating the second set of memory devices in a standby mode, copying data from the memory devices of the working mode into the main memory and into the memory devices of the standby mode, and performing a switchover between the operating modes when trouble occurs in the first set of memory devices. A second controller operates the switching system according to the data stored in the main memory.

BRIEF DESCRIPTION OF THE DRAWIGNS

The present invention will be described in detail further with reference to the following drawings, in which.

DETAILED DESCRIPTION

Figure 1:
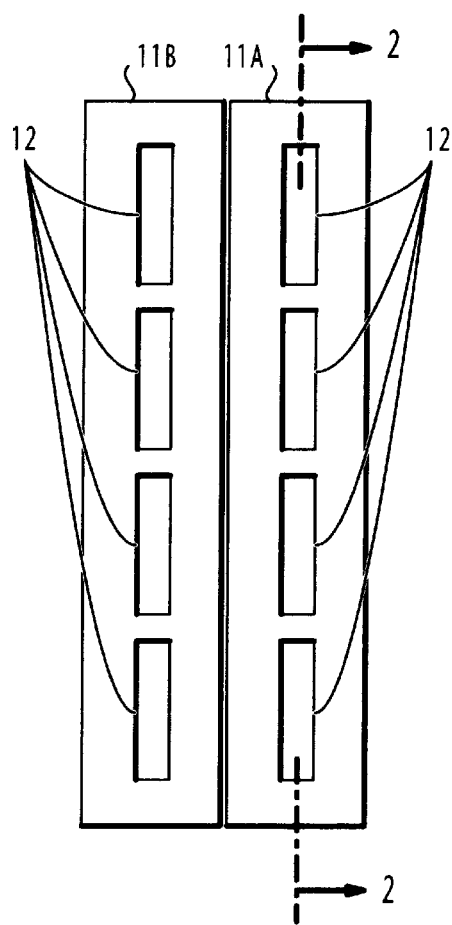
FIG. 1 is a front view of storage units of the present invention.
Figure 2:
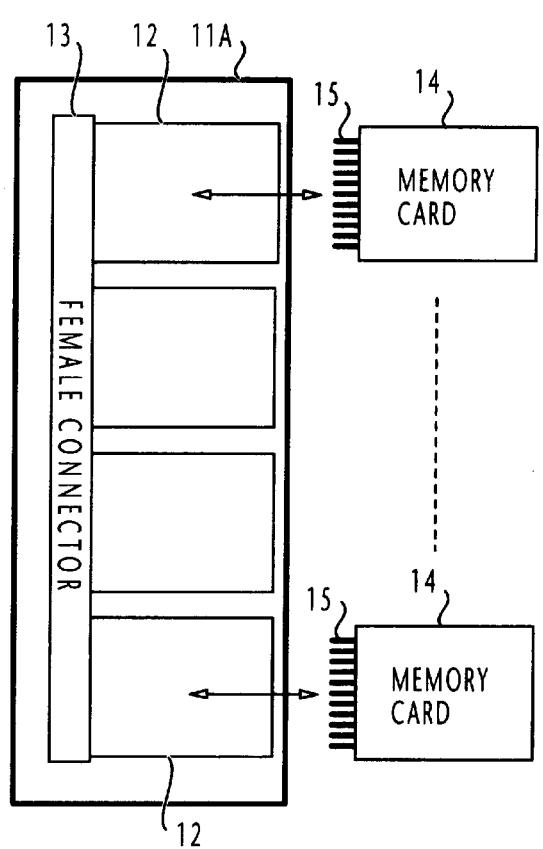
FIG. 2 is a cross-sectional view taken along the lines 2—2 of FIG. 1.

In FIGS. 1 and 2, there is shown a pair of storage units of the present invention for use in a stored program controlled switching system. Each of the storage units 11A and 11B is formed with an array of vertically extending slots 12 through which nonvolatile semiconductor memory cards 14 are inserted. At the innermost end of the slots 12 is provided a female connector 13 that is adapted to engage with connector pins 15 of the memory cards 14.

Figure 3:
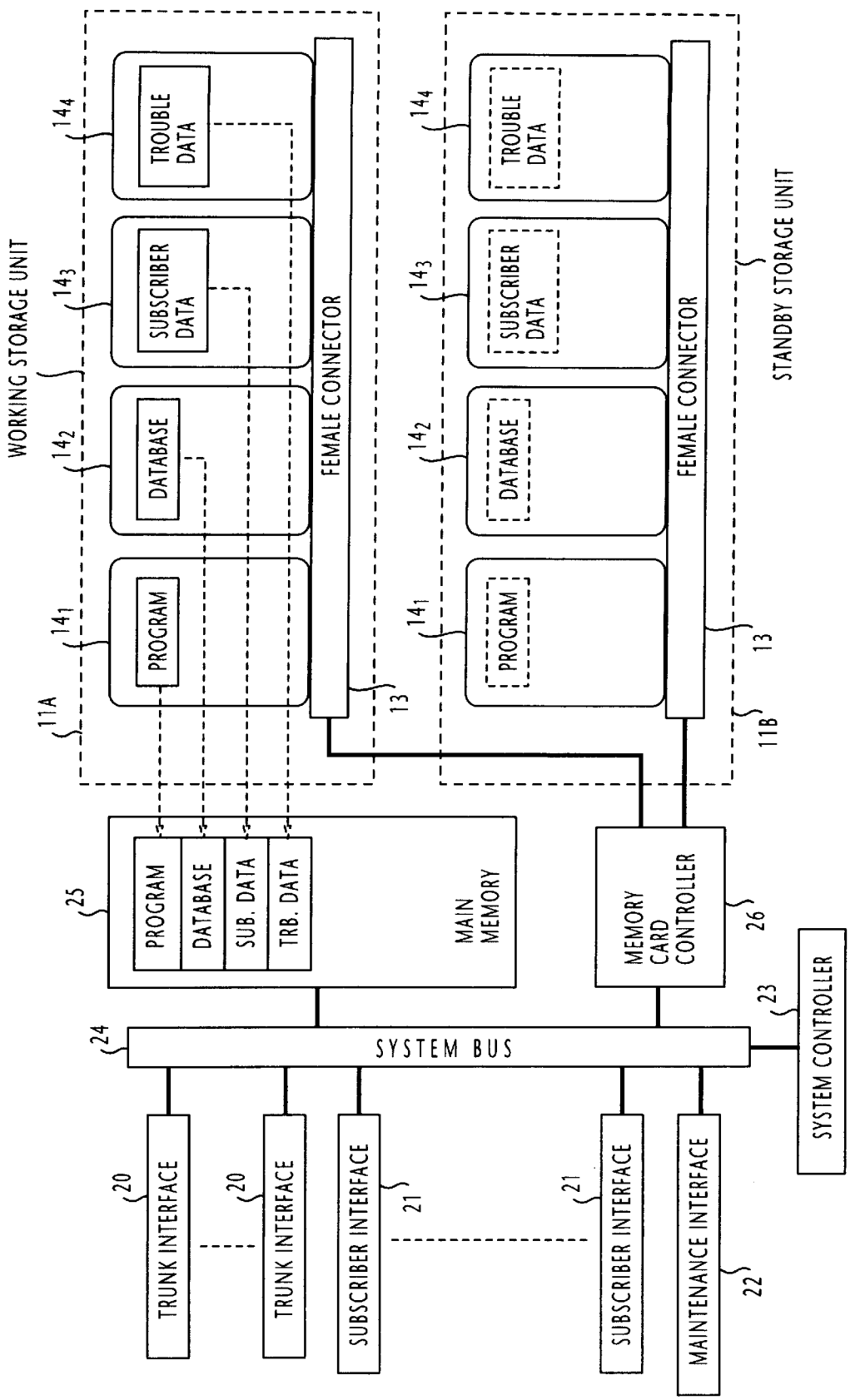
FIG. 3 is a block diagram of a stored program controlled switching system of the present invention.

As shown in FIG. 3, the stored program controlled switching system is comprised of a number of trunk interfaces 20 and a number of subscriber interfaces 21. Control signals from these interfaces are supplied to a system controller 23 through a system bus 24. Although not shown in the drawings, the traffic signals from other switching systems and subscribers to these interfaces are supplied to a switch fabric which is also controlled by the system controller 23. A maintenance interface 22 is also connected to the system bus 24 for applying a maintenance test signal to the switching system. Also connected to the system bus 24 are a main memory 25 and a memory card controller 26. Female connectors 13 of both working and standby storage units are connected to the memory card controller 26.

In the working unit 11A, the memory cards store data of different types. For example, switching control program, switching office database, tariff database, and trouble records are stored respectively in the memory cards $14_1$ $14_2$ $14_3$ and $14_4$. System controller 23 accesses the memory card controller 26 to cause it to perform a read operation on the memory cards of the working unit 11A according to a control program stored in the main memory 25. Initially, the system controller 23 accesses the memory card controller 26 to copy the data stored in each memory card of the working unit 11a onto a specified area of the main memory 25. In addition, under control of the memory card controller 26, data stored in the memory cards of the working unit 11A are duplicated by copying into corresponding memory cards of the standby unit 11B by synchronizing both units to each other. The contents of all memory cards of the working unit are checked against those of the standby unit so that when a change occurs in one memory card of the working unit, it is copied into the corresponding memory card of the standby unit.

When trouble occurs in the switching system, the system controller 23 directs the memory card controller 26 to perform a switchover from the working storage unit 11A to the standby storage unit 11B and alerts the maintenance personnel. In response to the alarm signal, the maintenance personnel withdraws all the memory cards of the suspected storage unit from their slots 12 and analyzes the contents of each memory card according to the type of its stored data in an attempt to locate the trouble. Data are stored in the memory cards 14 in such a format that personal computers are able to access. Data analysis of stored data can be efficiently performed and significant time saving can be achieved.

Figure 4:
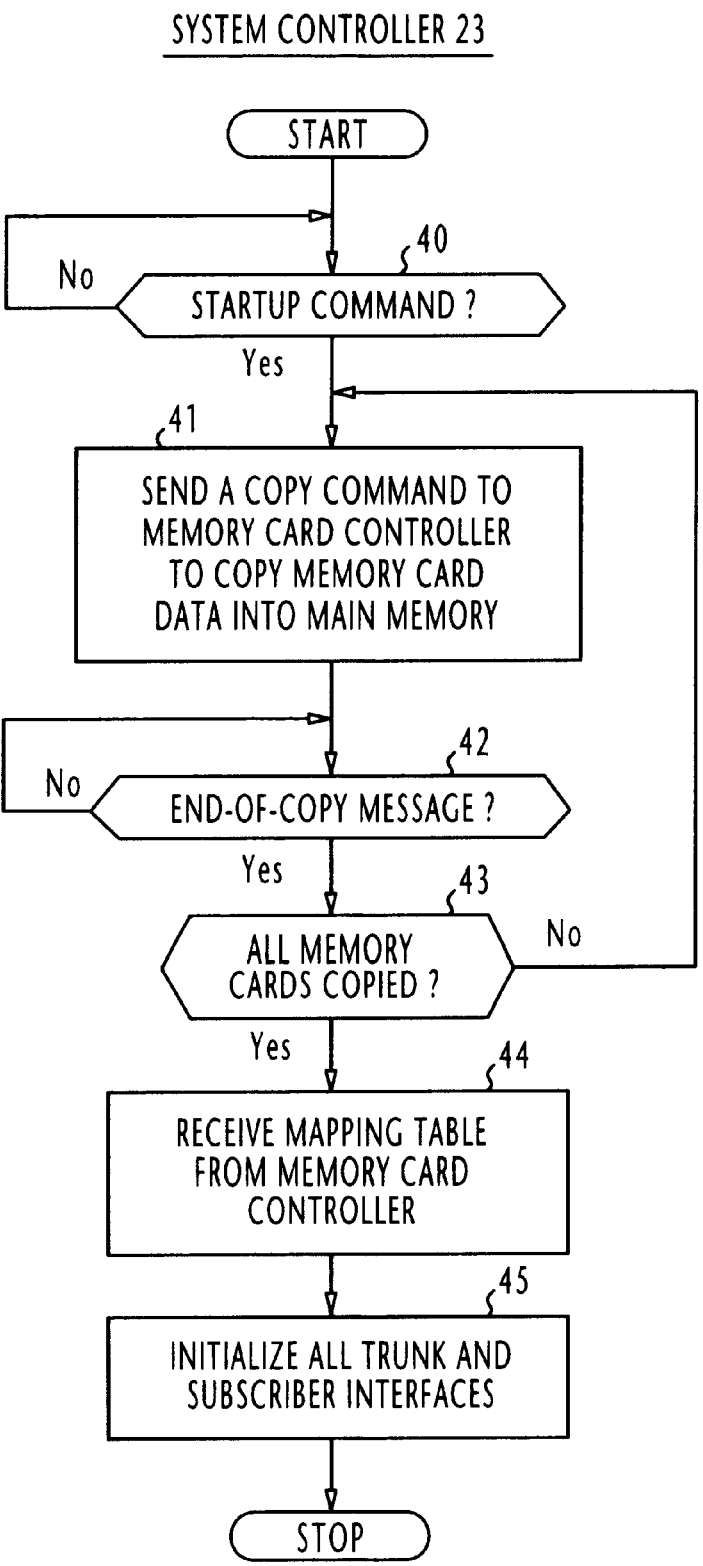
FIG. 4 is a flowchart of the operation of a system controller during system startup time.

The operation of the system controller 23 during system startup proceeds according to a program stored in its read-only memory as illustrated in the flowchart of FIG. 4. At decision step 40, the system controller 23 monitors the maintenance interface 22 to detect a startup command signal. If a startup command signal is detected, flow proceeds to step 41 to send a copy command signal to the memory card controller 26 to direct it to read the system control program from the memory card $14_1$ of the working unit 11A and copies the read program into a specified location of the main memory 23, and proceeds to decision step 42 to check to see if an end-of-copy message is received from the memory card controller 26. If the decision at step 42 is affirmative, the system controller repeats steps 41 and 42 until the stored data of all memory cards of the working unit 11A are copied into the main memory 25 (step 43). At step 44, the system controller 23 references a mapping table created by the memory card controller 26 and reads an address that is mapped to the storage location of the system control program in the main memory 25. System controller 23 reads the system control program and initializes the trunk interfaces 20 and the subscriber interfaces 2 (step 45) and proceeds to the end of the routine.

Figure 5:
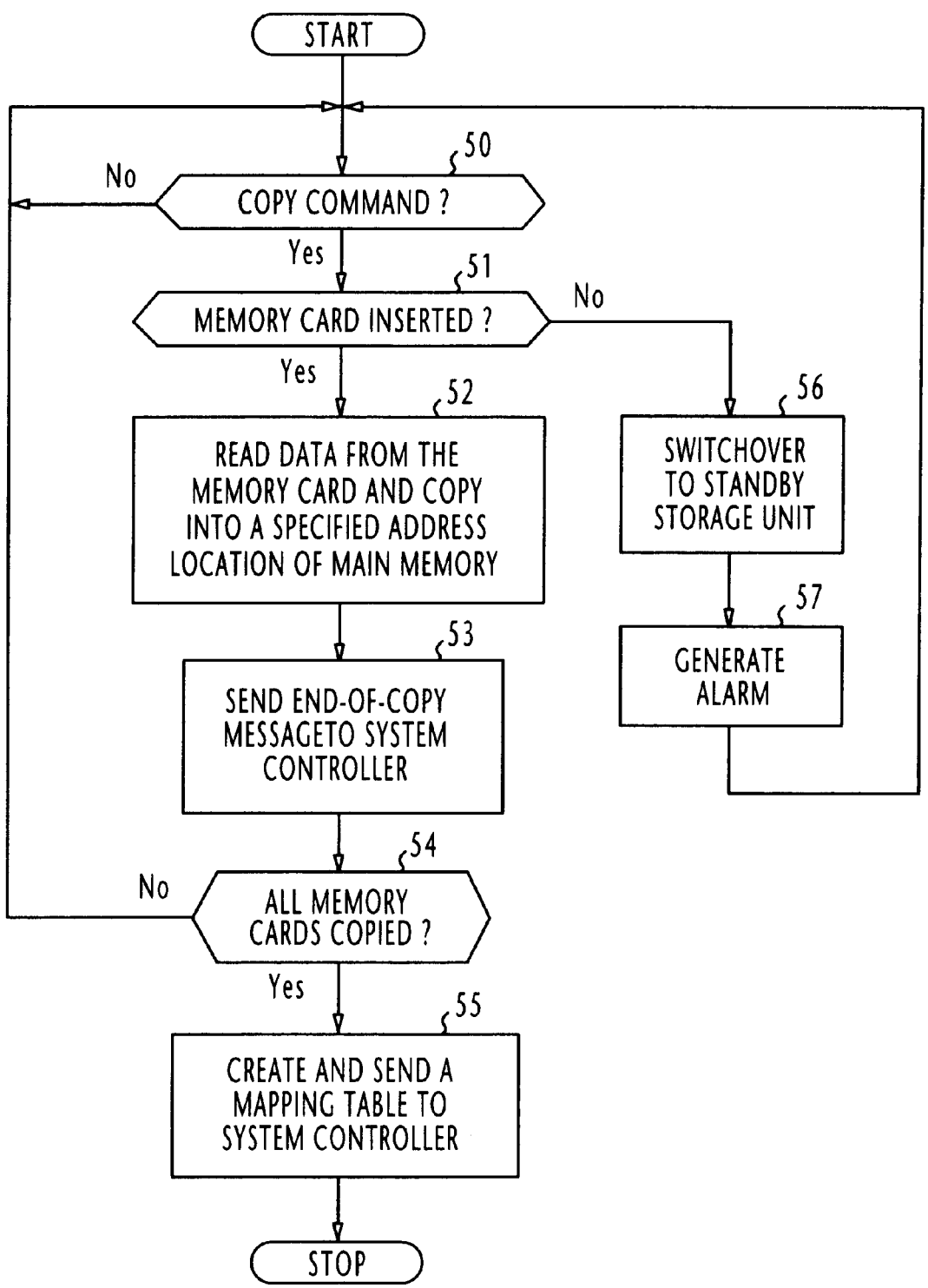
FIG. 5 is a flowchart of the operation of a memory card controller during the system startup time.

The operation of memory card controller 26 during the startup routine proceeds according to the flowchart of FIG. 5. At decision step 50, the memory card controller determines whether a copy command signal is received from the system controller 23. In response to a copy command signal, the memory card controller 26 proceeds from step 50 to step 51 to test a memory card of the working unit 11A to see if it is properly inserted into its own slot. If the test indicates that the memory card is not properly inserted, flow proceeds to step 56 to switchover to the standby storage unit 11B and generates an alarm (step 57) and returns to the starting point of the startup routine. Otherwise, the memory card controller proceeds to step 52 to read data from the memory card and copies it in a storage location of the main memory 25 and sends an end-of-copy message to the system controller 23 (step 53). Steps 50 to 53 are repeatedly performed until all memory cards are read and copied into the main memory 25 (step 54). At step 55, the memory card controller 26 creates a mapping table for mapping addresses of the main memory 25 to corresponding data of the memory cards and sends this address mapping table to the system controller 23.

Figure 6:
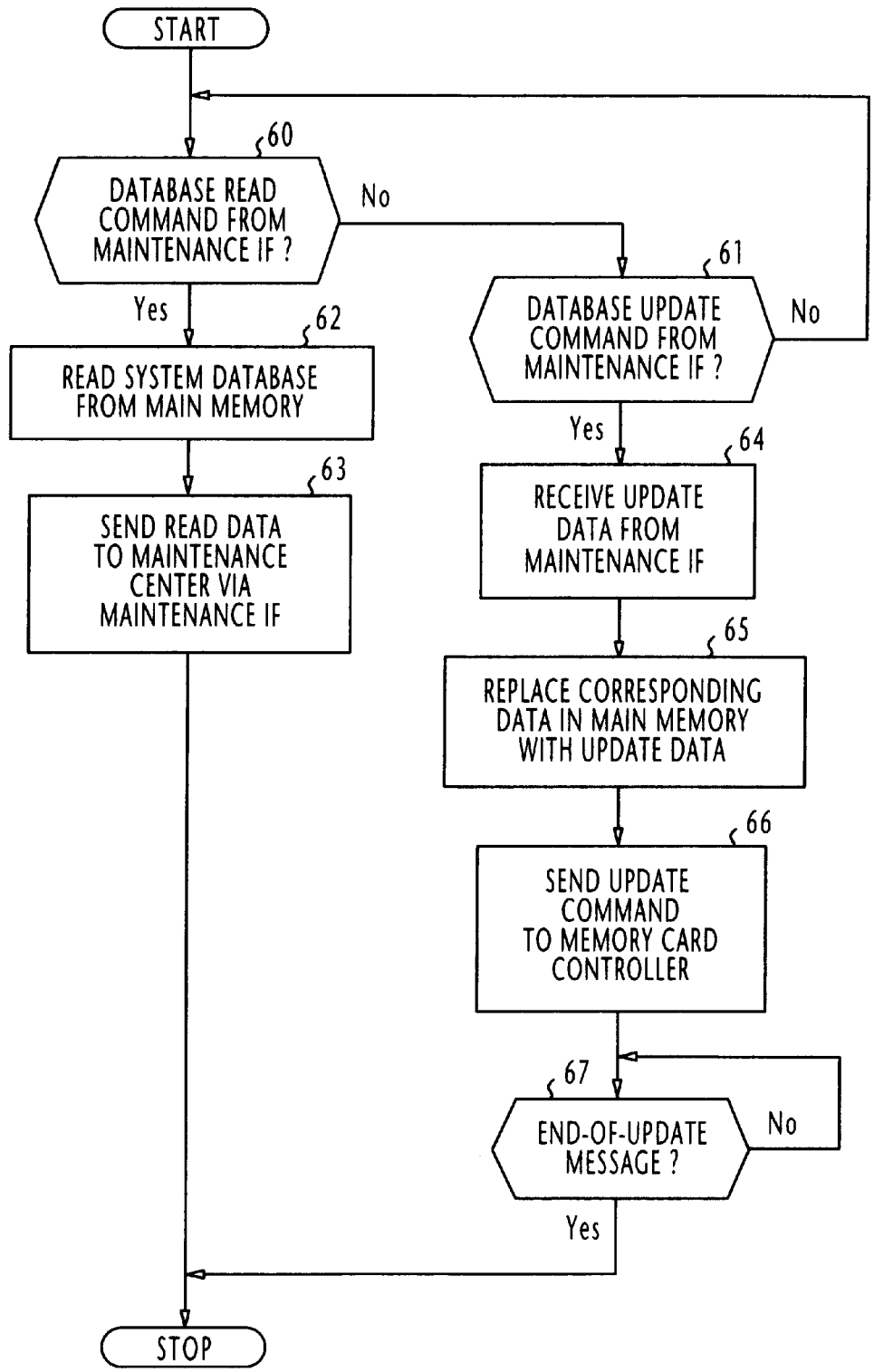
FIG. 6 is a flowchart of the operation of the system controller during normal operation of the switching system.

During normal operation of the switching system, the system controller 23 executes a routine illustrated in FIG. 6. System controller 23 monitors the output of maintenance interface 22 to detect a system database read command (step 60) or a system database update command (step 61). If the decision at step 60 is affirmative, the controller 23 reads the system database from the storage location of main memory 25 specified by the address mapping table supplied from the memory card controller 26 (step 62) and sends the read data to the maintenance center, not shown, through the maintenance interface 22. If a database update command signal is received (step 61), the system controller proceeds to step 64 to receive update data from the maintenance interface 22 and replace the corresponding data in the main memory 25 with the update data (step 65). At step 66, the system controller sends an update command signal to the memory card controller 26 and waits for an end-of-update message from the memory card controller (step 67).

Figure 7:
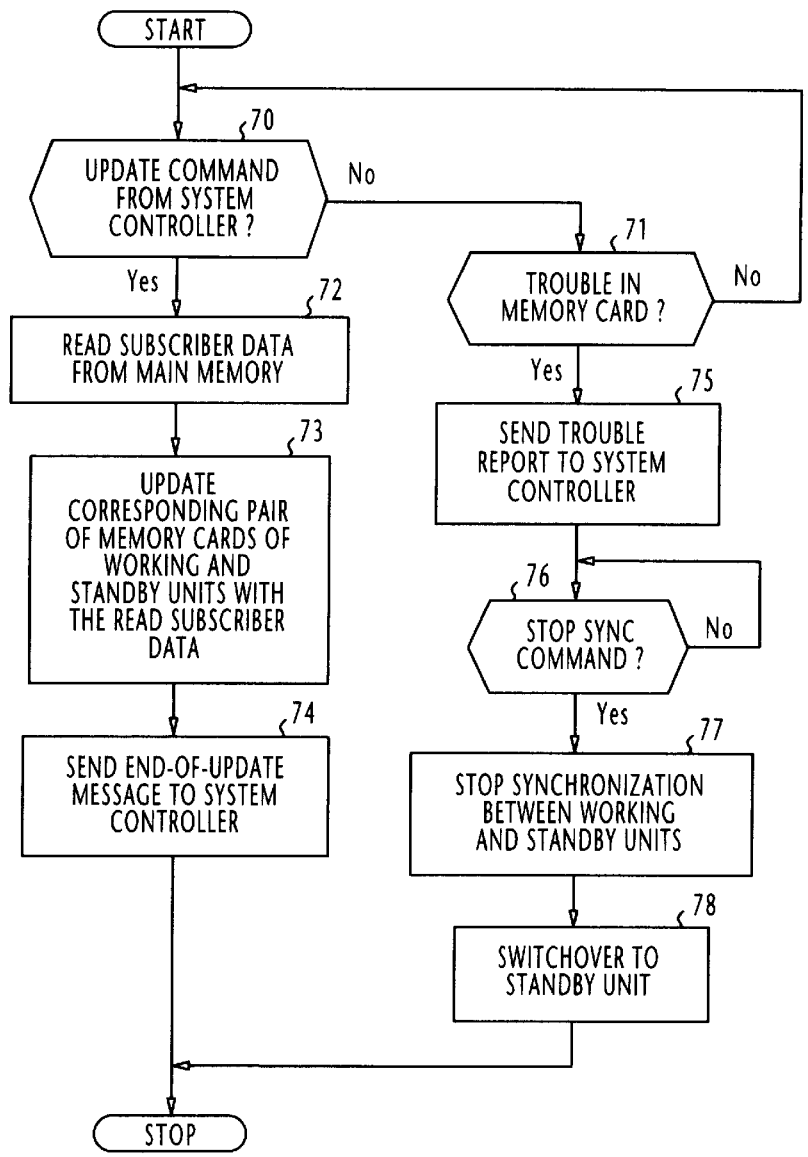
FIG. 7 is a flowchart of the operation of the memory card controller during normal operation of the switching system.
Figure 8:
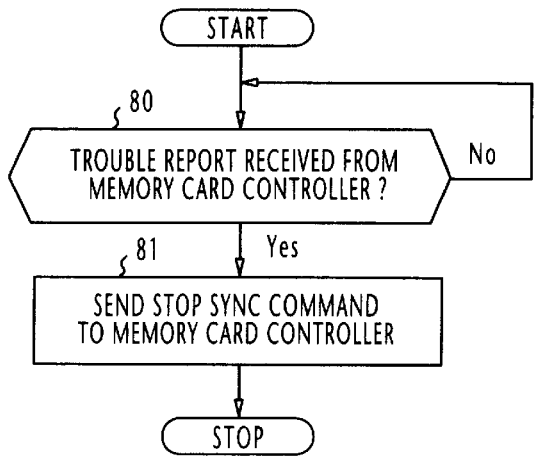
FIG. 8 is a flowchart of the system controller during the normal operation of the switching system.

During the normal operation, the memory card controller 26 executes the routine shown in FIG. 7. Memory card controller 26 starts the routine by monitoring the central processor 23 (step 70) and the working storage unit 11A (step 71). If an update command signal generated at step 66 by the system controller 23 is detected at step 70, the memory card controller 26 reads subscriber data from the main memory (step 72) and updates a pair of corresponding memory cards of both working and standby units 11A and 11B, which are synchronized to each other, with the read subscriber data (step 73). An end-of-update message is then returned to the system controller (step 74). If trouble occurs in a memory card of the working unit 11A, the memory card controller 26 proceeds from step 71 to step 75 to send a trouble report to the system controller 23 and waits for a stop sync command signal from the system controller (step 76). In response to a stop sync command signal, the memory card controller 26 stops synchronization between the working and standby storage units 11A and 11B (step 77) and switchovers the system to the standby unit 11B (step 78). When the system controller 23 receives the trouble report (step 80) as shown in FIG. 8, it sends a stop sync command signal to the memory card controller 26.

It will be seen from the foregoing that when trouble occurs in the working storage unit 11A, the memory cards can be withdrawn individually from their slots and can be checked according to the data types. This facilitates trouble shooting and maintenance routine. Furthermore, the present invention is advantageous over the prior art hard disk system because of reduced inventory that will be required for holding replacement parts. In addition, the memory cards are in the format that allows personal computers to perform read/write operation, data analysis can be significantly improved in efficiency. Since the same recording medium is used for both working and standby storage units, efficient backup and maintenance operations can be achieved.

What is claimed is:

1. A stored program controlled switching system comprising:

a first set of detachably mounted nonvolatile semiconductor memory devices for respectively storing data of different types including a control program;

a second set of detachably mounted nonvolatile semiconductor memory devices for respectively storing said data of different types;

a main memory;

a first controller for operating said first set of memory devices in a working mode and operating said second set of memory devices in a standby mode, copying data from the memory devices of the working mode into said main memory and into the memory devices of said standby mode, and performing a switchover between said operating modes when trouble occurs in said first set of memory devices; and a second controller for operating the switching system according to the data stored in said main memory.

2. A stored program controlled switching system as claimed in claim 1, wherein each memory device of said first and second sets of memory devices is formatted such that personal computers can perform read and write operation on the memory device.

3. A stored program controlled switching system as claimed in claim 1, wherein said first controller is arranged to create an address mapping table for mapping a plurality of addresses to said data stored in said main memory, and wherein said second controller is arranged to access data stored in said main memory according to the address mapping table.

4. A stored program controlled switching system as claimed in claim 1, further comprising a maintenance circuit, wherein said second controller is arranged to read data from said main memory in response to an update command signal from said maintenance circuit and update a corresponding one of the memory devices of said working mode and a corresponding one of the memory devices of said standby mode with said read data.

5. A stored program controlled switching system as claimed in claim 1, wherein said first controller is arranged to monitor said first set of memory devices and send a trouble report to said second controller is a trouble is detected in one of the first set of memory devices, wherein said second controller is arranged to send a command signal to said first controller in response to said trouble report, and wherein said first controller is arranged to stop synchronization between said first and second sets of memory devices in response to the command signal from the second controller and perform said switchover between said first and second sets of memory devices.

6. The stored program controlled switching system of claim 1, wherein, each of the first set of memory devices is configured to store data of an application type different than the remaining ones of first set of memory devices; and each of the second set memory devices store the same data as a corresponding one of the first set of memory devices.

7. The stored program controlled switching system of claim 1, wherein, said first controller copies all data from the memory devices of the working mode into said main memory during a system startup under direction of a program stored in read-only memory and initiated by a system start-up command signal.

8. The stored program controlled switching system of claim 7, wherein, during system startup, said first controller is configured to test the memory devices in working mode for proper insertion and to halt startup when proper insertion is not verified.

9. The stored program controlled switching system of claim 7, wherein, the data copied by said first controller from the memory devices of the working mode into said main memory during a system startup includes the control program.

10. A stored program controlled switching system comprising:

a first storage unit including a set of slots and a first set of nonvolatile semiconductor memory cards detachably respectively mounted in said slots, each of said memory cards storing data of a different type, one of the memory cards storing a control program;

a second storage unit including a set of slots and a second set of nonvolatile semiconductor memory cards detachably respectively mounted in said slots;

a main memory;

a first controller for operating said first set of memory cards in a working mode and operating said second set of memory cards in a standby mode, copying data from the memory cards of the working mode into said main memory and into the memory cards of said standby mode, and performing a switchover between said operating modes when trouble occurs in said first set of memory cards; and a second controller for operating the switching system according to the data stored in said main memory.

11. A stored program controlled switching system as claimed in claim 10, wherein each memory card of said first and second sets of memory cards is formatted such that personal computers can perform read and write operation on the memory card.

12. A stored program controlled switching system as claimed in claim 10, wherein said first controller is arranged to create an address mapping table for mapping a plurality of addresses to said data stored in said main memory, and wherein said second controller is arranged to access data stored in said main memory according to the address mapping table.

13. A stored program controlled switching system as claimed in claim 10, further comprising a maintenance circuit, wherein said second controller is arranged to read data from said main memory in response to an update command signal from said maintenance circuit and update a corresponding one of the memory cards of said working, mode and a corresponding one of the memory cards of said standby mode with said read data.

14. A stored program controlled switching system as claimed in claim 10, wherein said first controller is arranged to monitor said first set of memory cards and send a trouble report to said second controller if a trouble is detected in one of the first set of memory cards, wherein said second controller is arranged to send a command signal to said first controller in response to said trouble report, and wherein said first controller is arranged to stop synchronization between said first and second set of memory cards in response to the command signal from the second controller and perform said switchover between said first and second sets of memory cards.

15. The stored program controlled switching system of claim 10, wherein, said first controller copies data from said first set of memory cards in a working mode into said main memory responsive to a system startup command.

16. The stored program controlled switching system of claim 15, wherein, during system startup, said first controller is configured to verify proper insertion of said first set of memory cards and to halt startup when proper insertion is not verified.

* * * * *

UNITED STATES PATENT AND TRADEMARK OFFICE
CERTIFICATE OF CORRECTION

PATENT NO.      : 6,748,552 B2
DATED           : February 1, 2001
INVENTOR(S)     : Nobuyuki Seguchi It is certified that error appears in the above-identified patent and that said Letters Patent is hereby corrected as shown below:

<u>Title page,</u>
Item [30], Foreign Application Priority Data, should read as follows:
"Jan. 2, 2000 (JP)...........200-024016" to -- Feb. 1, 2000 (JP)....................2000-024016 --

Signed and Sealed this

Seventeenth Day of August, 2004

JON W. DUDAS
*Acting Director of the United States Patent and Trademark Office*